United States Patent
Qi et al.

(10) Patent No.: US 12,527,247 B1
(45) Date of Patent: Jan. 20, 2026

(54) AUTOMATIC DETECTION DEVICE FOR SEED VIGOR

(71) Applicant: Huzhou University, Huzhou (CN)

(72) Inventors: Hengnian Qi, Huzhou (CN); Zeyu Sun, Huzhou (CN); Mengbo He, Huzhou (CN); Shuqiang Hu, Huzhou (CN); Junyi Chen, Huzhou (CN); Chu Zhang, Huzhou (CN)

(73) Assignee: Huzhou University, Huzhou (CN)

( * ) Notice: Subject to any disclaimer, the term of this patent is extended or adjusted under 35 U.S.C. 154(b) by 0 days.

(21) Appl. No.: 19/180,776

(22) Filed: Apr. 16, 2025

(30) Foreign Application Priority Data

Jul. 19, 2024 (CN) .......................... 202410973555.8

(51) Int. Cl.
*A01C 1/02* (2006.01)
*G06T 7/00* (2017.01)

(52) U.S. Cl.
CPC ............ *A01C 1/025* (2013.01); *G06T 7/0012* (2013.01); *G06T 2207/10036* (2013.01); *G06T 2207/30188* (2013.01)

(58) Field of Classification Search
CPC .............. A01C 1/025; A01C 1/00; A01C 1/02
See application file for complete search history.

(56) References Cited

U.S. PATENT DOCUMENTS

| | | | | |
|---|---|---|---|---|
| 8,626,337 B2 * | 1/2014 | Corak | .................. | B07C 5/3427 800/278 |
| 11,140,809 B2 * | 10/2021 | Barychev | ........... | G01N 21/3581 |
| 2008/0317279 A1 * | 12/2008 | Deppermann | ........... | G01N 1/04 382/100 |
| 2012/0137391 A1 * | 5/2012 | Davis | ...................... | A01C 1/00 800/298 |
| 2013/0176553 A1 * | 7/2013 | Cope | ...................... | G01N 21/33 356/402 |

FOREIGN PATENT DOCUMENTS

| | | | | |
|---|---|---|---|---|
| CA | 3077713 A1 * | 4/2019 | ......... | A01B 79/005 |
| CN | 117710506 A * | 3/2024 | .......... | G06N 3/0464 |
| CN | 118090627 A * | 5/2024 | ............. | G01N 21/47 |
| CN | 109328533 B * | 7/2024 | ............... | B08B 1/12 |

* cited by examiner

*Primary Examiner* — Monica L Perry
(74) *Attorney, Agent, or Firm* — Jason A. Smith; Shumaker, Loop & Kendrick, LLP

(57) ABSTRACT

An automatic detection device for seed vigor is provided. The automatic detection device for seed vigor includes a seed screening system and a seed dispersing and seeding device for arranging seeds in a matrix. The seed dispersing and seeding device includes a seeding mechanism and a seeding disc capable of linearly moving along a horizontal direction. Seeding ports capable of being opened and closed are formed in a disc surface of the seeding disc. The seeding ports are arranged in a matrix. The seeding mechanism is used for putting single seeds into the seeding ports. The seed screening system includes a seed screening device and a hyperspectral imaging device for detecting seed vigor. The hyperspectral imaging device includes a hyperspectral lens located above the seeding disc. The seed screening device includes a seed sucker and a multi-axis mechanical arm for moving the seed sucker.

10 Claims, 15 Drawing Sheets

AUTOMATIC DETECTION DEVICE FOR SEED VIGOR

CROSS-REFERENCE TO RELATED APPLICATION

This patent application claims the benefit and priority of Chinese Patent Application No. 2024109735558, filed with the China National Intellectual Property Administration on Jul. 19, 2024, the disclosure of which is incorporated by reference herein in its entirety as part of the present application.

TECHNICAL FIELD

The present disclosure relates to the technical field of plant seed vigor detection, in particular to an automatic detection device for seed vigor.

BACKGROUND

The identification of seed vigor is not only the basis of variety tests, but also of great significance to the breeding of new varieties. During post-harvest treatment, thermal damage or physical damage caused by improper operation may cause loss of seed vigor. During storage, the respiration of seeds may produce a lot of water and heat, which may also cause the aging of seeds and affect seed vigor. Therefore, accurate identification of seed vigor before sowing can effectively screen out high-quality seeds for planting. The yield and quality of seeds can be greatly improved, so that agricultural development and economic stability are promoted.

Although the identification results of traditional physiological and biochemical methods and germination tests are reliable, these methods need to consume special reagents, and have some disadvantages, such as long cycle, high cost and sample damage. Spectral imaging technology is a comprehensive technology integrating detector technology, precision optical machinery, weak signal detection, computer technology and information processing technology. The spectral imaging technology has many bands and narrow width, wide spectral response range, high spectral resolution, "spectral image integration" and other characteristics. In the ultraviolet, visible, near-infrared and medium-infrared regions, hundreds of spectral data with very small band intervals and spectral continuity are obtained. Each pixel in the spectrum corresponds to one continuous spectrum, which can reflect the internal composition information of an object to be measured. The spectral imaging technology has broad application prospects in the field of agricultural research.

High spectroscopy can not only obtain the spectral information and image information of a sample, but also reflect the internal physical structure and chemical composition of the sample. The detection efficiency is higher. High spectroscopy has no damage to the sample and can better meet the needs of non-destructive testing. However, in the prior art, in the field of seed vigor detection devices based on depth spectrum, the entire process from placing seeds, detecting seeds and screening vigor seeds does not realize full automation, and the detection speed of the seed vigor detection device is slow.

At present, it is urgent to propose an automatic detection device for seed vigor, which can realize the automation of seed placement, seed detection and vigorous seed screening in the whole process.

SUMMARY

The present disclosure aims to provide an automatic detection device for seed vigor to solve the problems in the prior art. Seeds are arranged in a matrix on a seeding disc, and then the seeding disc is moved to the lower part of a hyperspectral lens. The hyperspectral lens scans the seeds row by row. A multi-axis mechanical arm drives a seed sucker to accurately reach the positions of non-vigorous seeds according to coordinates, and the non-vigorous seeds are sucked by the seed sucker, so that the seeds with better vigor are retained in the seeding disc to realize screening of the seeds. The automation of the whole process is realized. The device is high in production efficiency and good in screening effect. Manpower and material resources are greatly saved. The device is suitable for large-scale promotion.

In order to achieve the above purpose, the present disclosure provides the following scheme. An automatic detection device for seed vigor is provided, including a seed screening system and a seed dispersing and seeding device for arranging seeds in a matrix.

The seed dispersing and seeding device includes a seeding mechanism and a seeding disc capable of linearly moving along a horizontal direction. A disc surface of the seeding disc is arranged horizontally. Seeding ports capable of being opened and closed are formed in the disc surface of the seeding disc. The seeding ports are arranged in a matrix. A line direction of the seeding ports is parallel to a moving direction of the seeding disc. A row direction of the seeding ports is vertical to the moving direction of the seeding disc. The seeding mechanism is used for putting single seeds into the seeding ports.

The seed screening system includes a seed screening device and a hyperspectral imaging device for detecting seed vigor. The hyperspectral imaging device includes a hyperspectral lens located above the seeding disc. A scanning area of the hyperspectral lens is located on a moving trail of the seeding disc. The scanning length of the scanning area along the row direction of the seeding ports is capable of covering at least a single row of seeding ports. The seed screening device includes a seed sucker and a multi-axis mechanical arm for moving the seed sucker. A horizontal moving area of the seed sucker is located on the moving trail of the seeding disc. The moving range of the horizontal moving area along the row direction of the seeding ports is capable of covering a single row of seeding ports.

Preferably, the automatic detection device for seed vigor includes a hyperspectral support. The hyperspectral support includes a lens support frame vertically arranged and a lens connecting plate for installing the hyperspectral lens. The lens connecting plate is arranged on the top of the lens support frame. The hyperspectral lens is slidably connected with the lens connecting plate.

Preferably, the seeding mechanism includes air-suction seeding needles with adjustable suction and a vibration disc for placing seeds. The disc surface of the seeding disc is arranged horizontally. The air-suction seeding needles are arranged in rows. A row-up direction of the air-suction seeding needles is the same as the row direction of the seeding ports. The quantity of the air-suction seeding needles in a single row corresponds to the quantity of the seeding ports in a single row. The air-suction seeding needles reciprocate along the moving direction of the seeding disc through a swing mechanism. A vertical projection of a swing path of the air-suction seeding needle is located on a moving path of the seeding port corresponding to the air-suction seeding needle. The vibration disc is located between the air-suction seeding needles and the seeding disc at a height position. The vibration disc is located in the vertical projection of the swing path of the air-suction seeding needles at a horizontal position. The vibration disc and the air-suction seeding needles have a preset height difference capable of sucking seeds.

Preferably, seed guide tubes are arranged between the seeding disc and the air-suction seeding needles. The seed guide tubes are arranged in rows. A row-up direction of the seed guide tubes is the same as that of the air-suction seeding needles. The quantity of the seed guide tubes corresponds to that of the air-suction seeding needles. A tube opening in one end of the seed guide tube is arranged upward and provided with a seed feeding notch. The seed feeding notch faces the air-suction seeding needle and is located on the swing path of the air-suction seeding needle. A tube opening in the other end of the seed guide tube is a tapered tube opening and arranged downward. A vertical projection of the tapered tube opening is located on the moving path of the seeding port.

Preferably, the automatic detection device for seed vigor includes a device stand and a gas needle installation part for installing the air-suction seeding needles. The gas needle installation part is rotatably connected to the device stand through a rotating shaft. An axis of the rotating shaft is parallel to the row-up direction of the air-suction seeding needles. The device stand is provided with a moving space for the seeding disc to pass through.

Preferably, the seeding disc includes an upper disc body and a lower disc body which are laminated up and down. The upper disc body is capable of moving along the line direction of the seeding ports, and the lower disc body is capable of moving along the line direction or row direction of the seeding ports. The seeding port includes an upper normally-open port formed in the upper disc body and a lower normally-open port formed in the lower disc body. A vertical projection of the upper normally-open port is capable of coinciding with a moving path of the lower normally-open port.

Preferably, the seeding disc moves through a linear sliding rail, and the linear sliding rail passes through the moving space.

Preferably, two seeding discs are provided and include a first seeding disc and a second seeding disc, respectively. A moving trail of the first seeding disc is located above a moving trail of the second seeding disc.

Preferably, the automatic detection device for seed vigor includes a sliding rail support frame. Two linear sliding rails are provided and include a first sliding rail and a second sliding rail, respectively. The first sliding rail and the second sliding rail are fixedly arranged on the sliding rail support frame. The first sliding rail is located above the second sliding rail. The first sliding rail is slidably connected with the first seeding disc, and the second sliding rail is slidably connected with the second seeding disc.

Preferably, the sliding rail support frame is a cuboid of which an opening is formed in the top. The second seeding disc is embedded into the sliding rail support frame. A disc surface of the second seeding disc faces the opening of the sliding rail support frame. The moving trail of the first seeding disc is located above the sliding rail support frame.

Compared with the prior art, the present disclosure has the following technical effects.

Firstly, the degree of automation is high. The seeds are implanted into the seeding ports of the seeding disc through the seeding mechanism. The seeds are arranged in a matrix on the seeding disc, and then the seeding disc is moved below the hyperspectral lens. The seeds on the seeding disc are scanned by the hyperspectral lens, and the seeds can be scanned by the hyperspectral lens row by row. A control device recognizes non-vigorous seeds according to scanning information, and the coordinates of the non-vigorous seeds are marked. And then the coordinate information of the non-vigorous seeds is sent to the multi-axis mechanical arm. The multi-axis mechanical arm drives the seed sucker to accurately reach the positions of the non-vigorous seeds according to the coordinates, and the non-vigorous seeds are sucked by the seed sucker, so that the seeds with better vigor are retained in the seeding disc to realize screening of seeds. Placement of the seeds on the seeding disc row by row, vigor detection for the seeds and screening of vigor seeds can be completed automatically, thus realizing the automation of the whole process, having high production efficiency and good screening effect, greatly saving manpower and material resources, and being suitable for large-scale promotion.

Other technical schemes of the present disclosure have the following technical effects.

Firstly, the seeding efficiency is improved. Through uniform dispersion of the vibration disc and quick suction of the air-suction seeding needles, the suction accuracy of seeds is obviously improved, and then the speed of seeding is improved, so that the whole operation efficiency is promoted.

Secondly, the seeding accuracy is promoted. The suction of the air-suction seeding needles is adjustable, and it is ensured that only one seed is sucked every time, so that the accuracy of seeding is improved, and the situation of double seeds or seed leakage is reduced.

Thirdly, the damage rate of seeds is reduced. In the suction manner of the air-suction seeding needles, due to decrease in physical contact with seeds, the damage of seeds during seeding can be obviously reduced, especially for fragile or sensitive seeds, which helps to maintain the growth environment of seeds and reduce resource waste.

Fourthly, the applicability is wide. The device is suitable for seeds of various sizes and shapes. By adjusting the parameters of the air-suction seeding needles and the vibration condition of the vibration disc, the device can flexibly adapt various seeding requirements.

Fifthly, the manual intervention is reduced. The improvement of the degree of automation reduces the need for manual intervention, thereby reducing the labor intensity, and also reducing the possibility of human errors at the same time.

Sixthly, the cost is saved. The promotion of efficiency and decrease in damage rate directly influence the usage rate of seeds and planting cost, and the cost can be obviously saved by using the air-suction seed dispersing and seeding device for a long time.

BRIEF DESCRIPTION OF THE DRAWINGS

To describe the technical scheme in the embodiments of the present disclosure or in the prior art more clearly, the following briefly introduces the attached figures required for describing the embodiments. Apparently, the attached figures in the following description show merely some embodiments of the present disclosure, and those skilled in the art may still derive other attached figures from these attached figures without creative efforts.

Reference signs: 1, air-suction seeding needle; 2, vibration disc; 3, seeding disc; 4, seed guide tube; 5, device stand; 6, gas needle installation part; 7, installation beam; 8, installation transverse plate; 9, telescopic cylinder; 10, connecting rod; 11, installation head; 12, adjusting head; 13, vibration device; 14, linear sliding rail; 15, rotating shaft; 16, bearing; 17, upper disc body; 18, lower disc body; 19, upper normally-open port; 20, lower normally-open port; 21, first strip hole; 22, second strip hole; 23, third strip hole; 24, first adjusting bolt; 25, second adjusting bolt; 26, seed feeding notch; 27, tapered tube opening; 28, moving space; 29, conveying equipment; 30, hyperspectral lens; 31, seed sucker; 32, multi-axis mechanical arm; 33, lens support frame; 34, lens connecting plate; 35, first seeding disc; 36, second seeding disc; 37, sliding rail support frame; 38, machine body; 39, base; 40, seed sucker connecting plate; 41, neon bulb support; 42, lifting rod; 43, first rotating body; and 44, second rotating body.

DETAILED DESCRIPTION OF THE EMBODIMENTS

The following clearly and completely describes the technical scheme in the embodiments of the present disclosure with reference to the embodiments of the present disclosure. Apparently, the described embodiments are merely a part rather than all of the embodiments of the present disclosure. Based on the embodiment in the present disclosure, all other embodiments acquired by the ordinary technical staff in the art under the premise of without contributing creative labor belong to the scope protected by the present disclosure.

To make the foregoing objective, features and advantages of the present disclosure clearer and more comprehensible, the present disclosure is further described in detail below with reference to the attached figures and specific embodiments.

Figure 1:
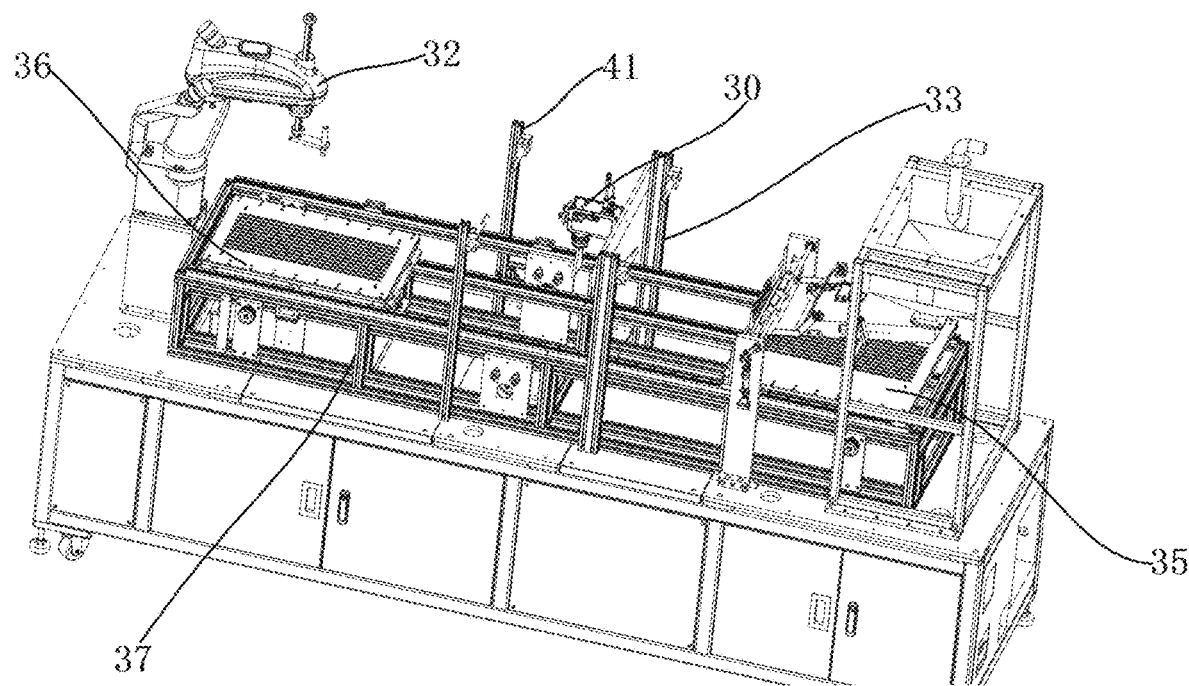
FIG. 1 is an integral structure diagram of the present disclosure.
Figure 2:
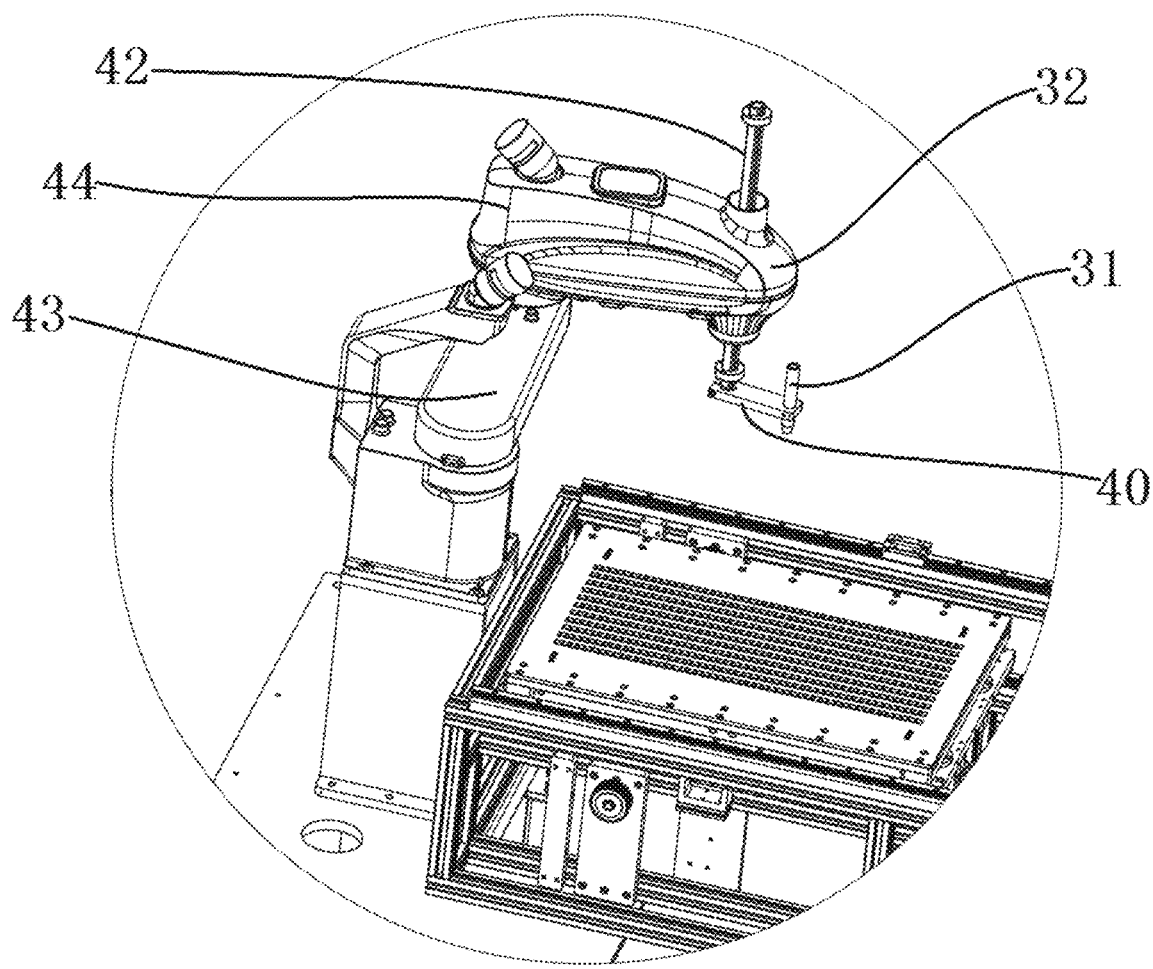
FIG. 2 is a local enlarged drawing of FIG. 1.
Figure 3:
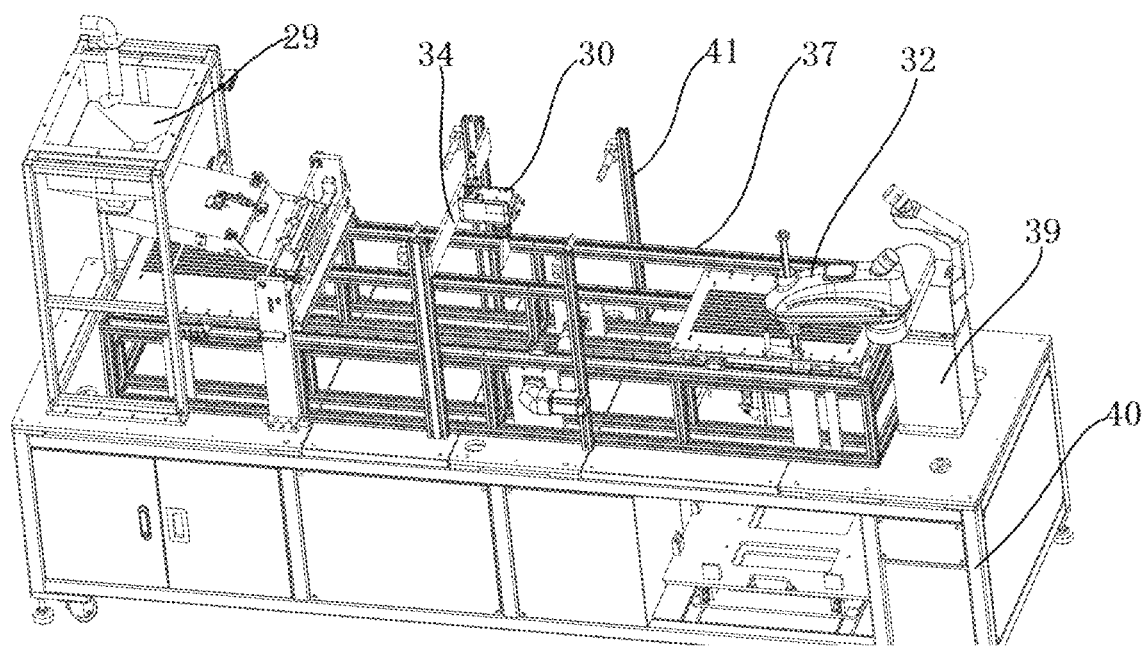
FIG. 3 is an integral structure diagram of the present disclosure at another viewing angle.
Figure 4:
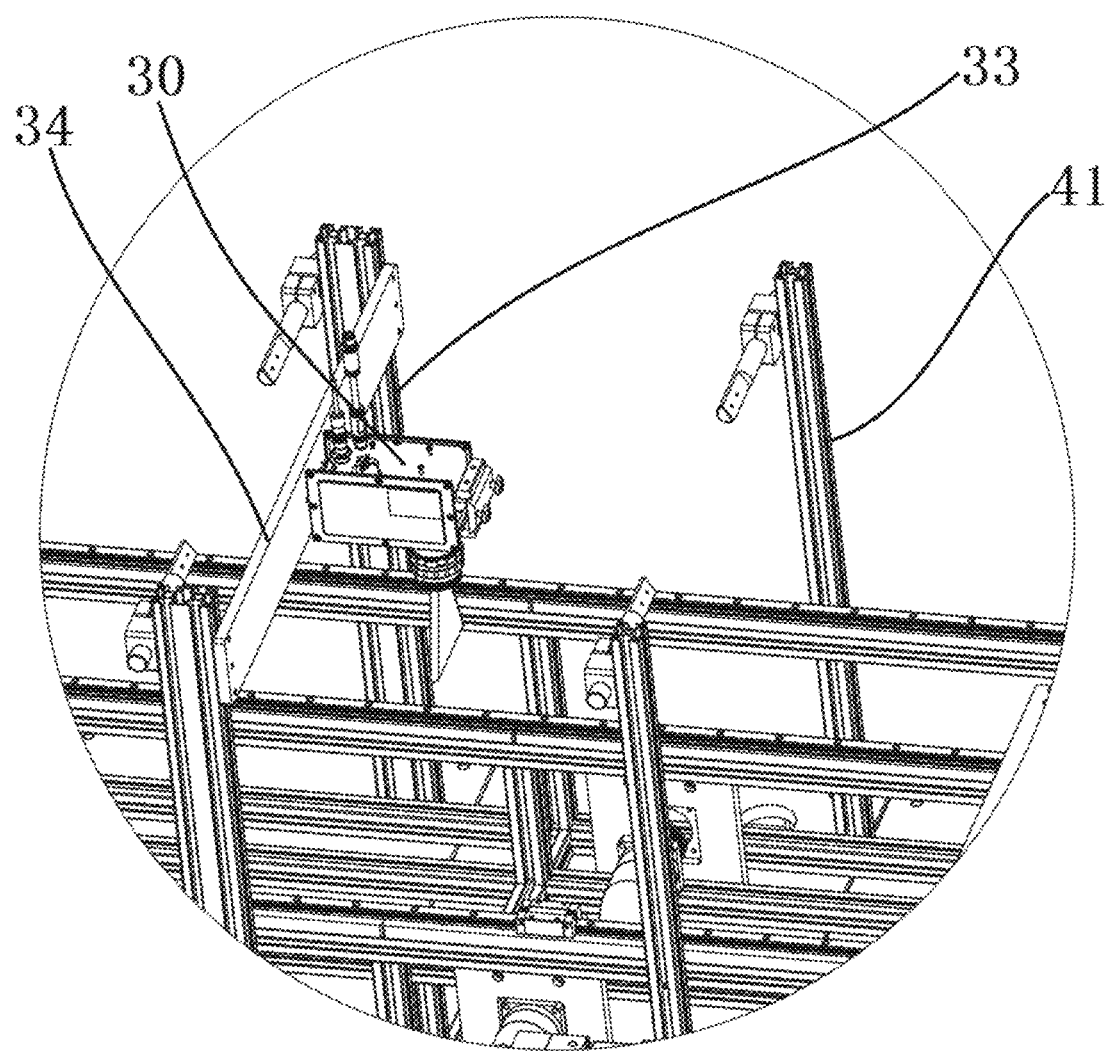
FIG. 4 is a local enlarged drawing of FIG. 3.
Figure 5:
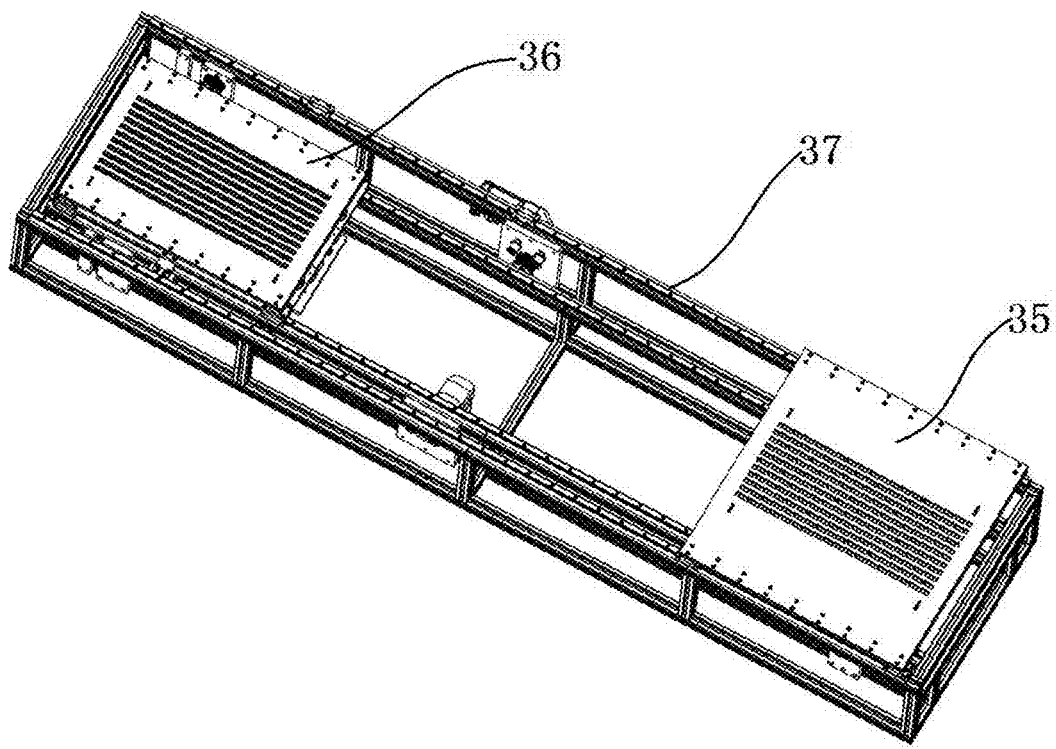
FIG. 5 is a structure diagram of a sliding rail support frame.
Figure 6:
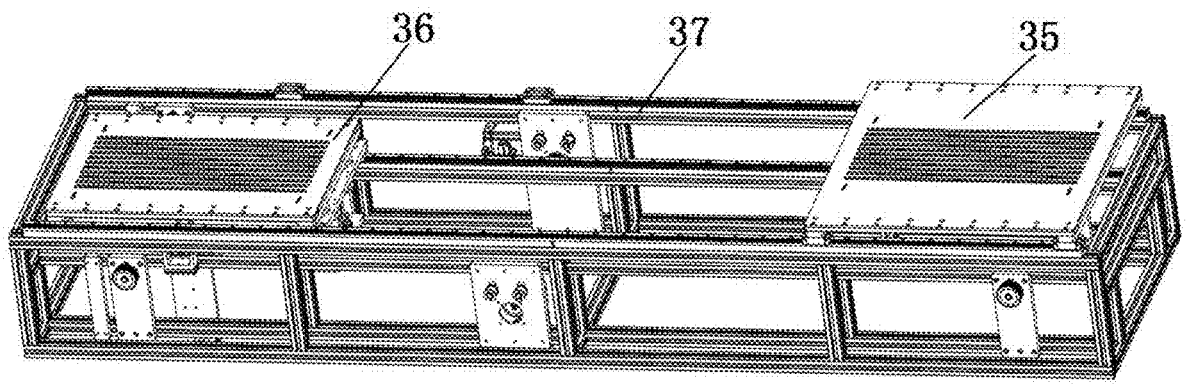
FIG. 6 is a schematic diagram of a sliding rail support frame at another viewing angle.
Figure 7:
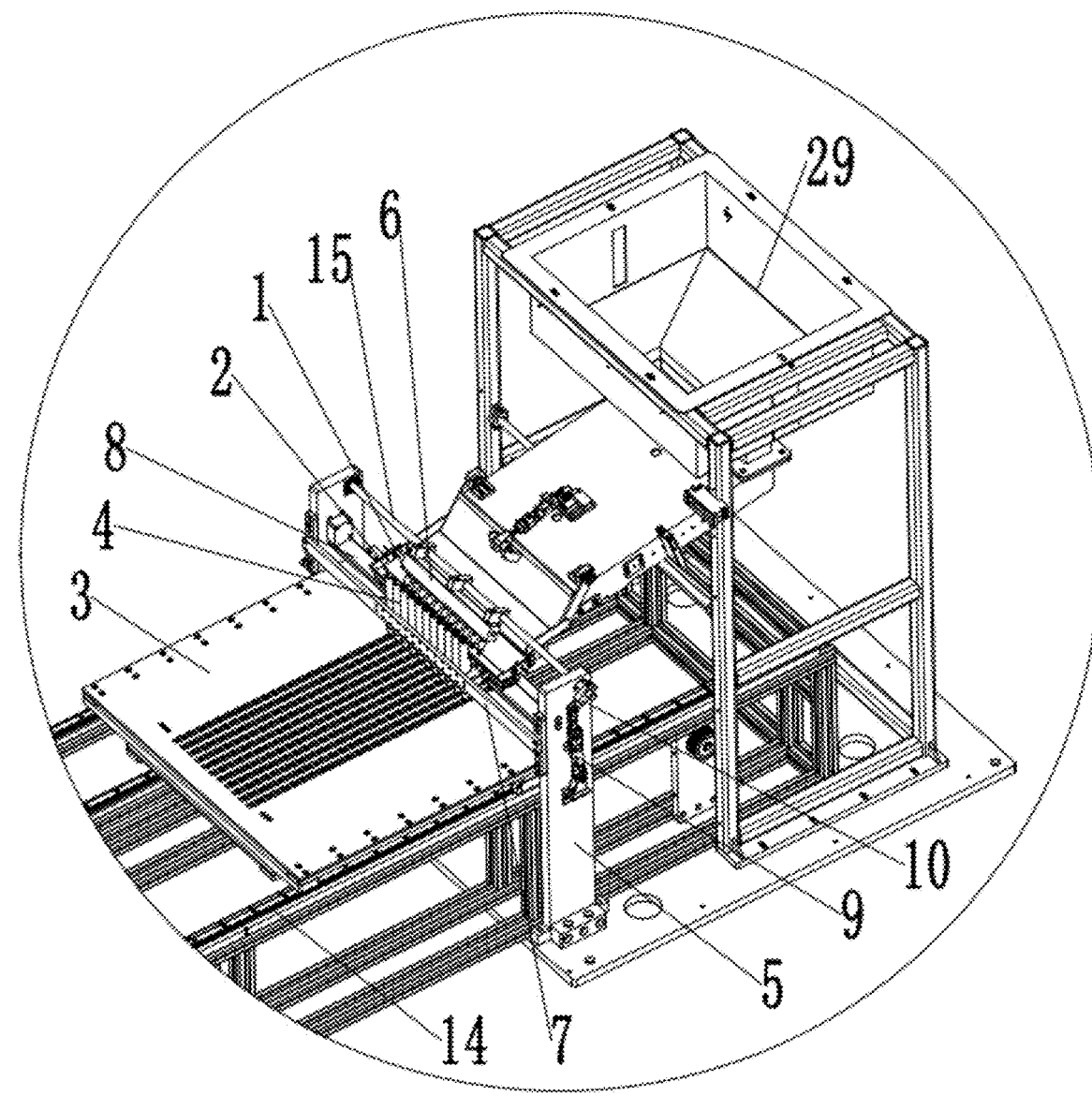
FIG. 7 is a three-dimensional structure diagram of an air-suction seed dispersing and seeding device.
Figure 8:
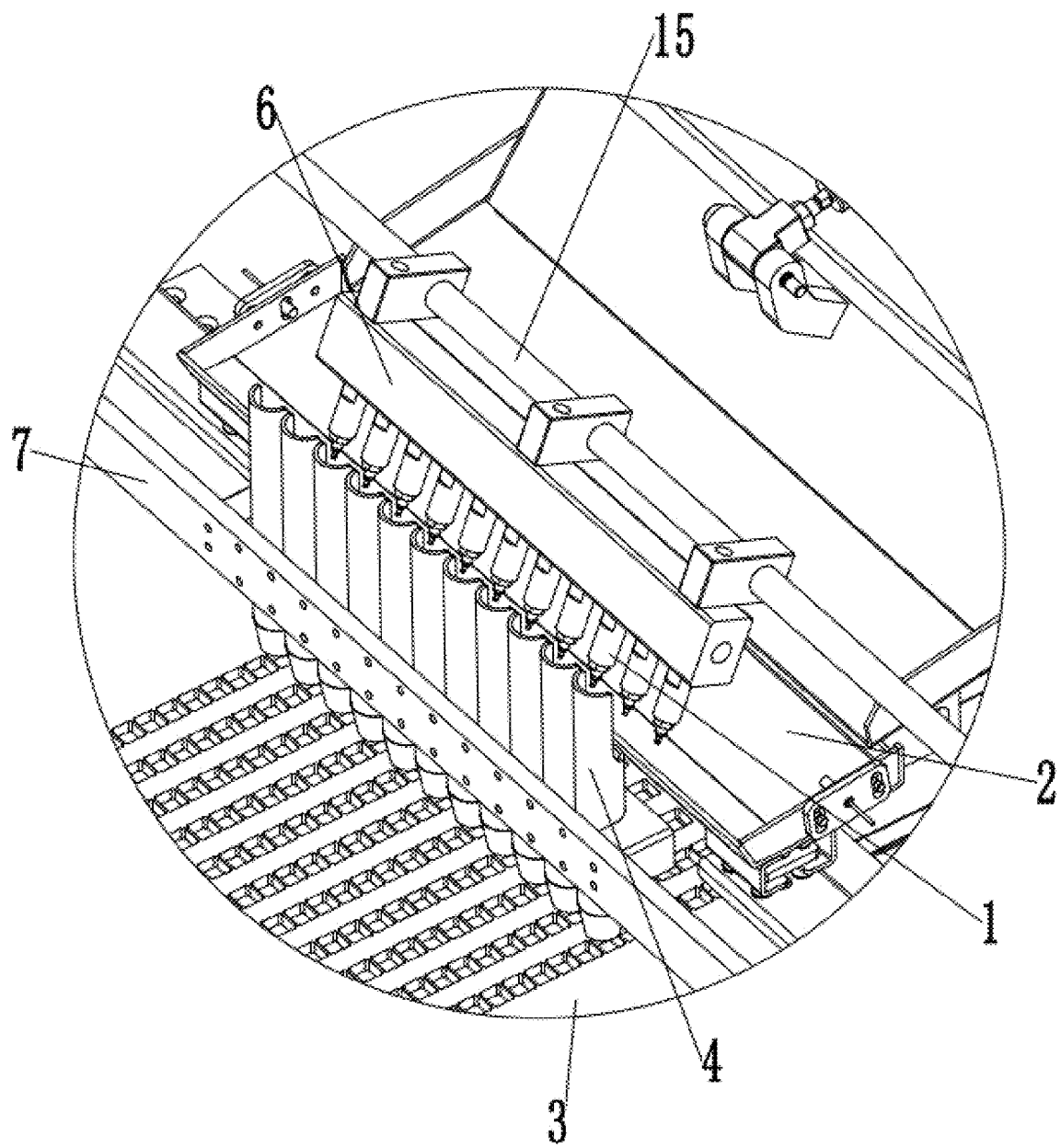
FIG. 8 is a local enlarged drawing of FIG. 7.
Figure 9:
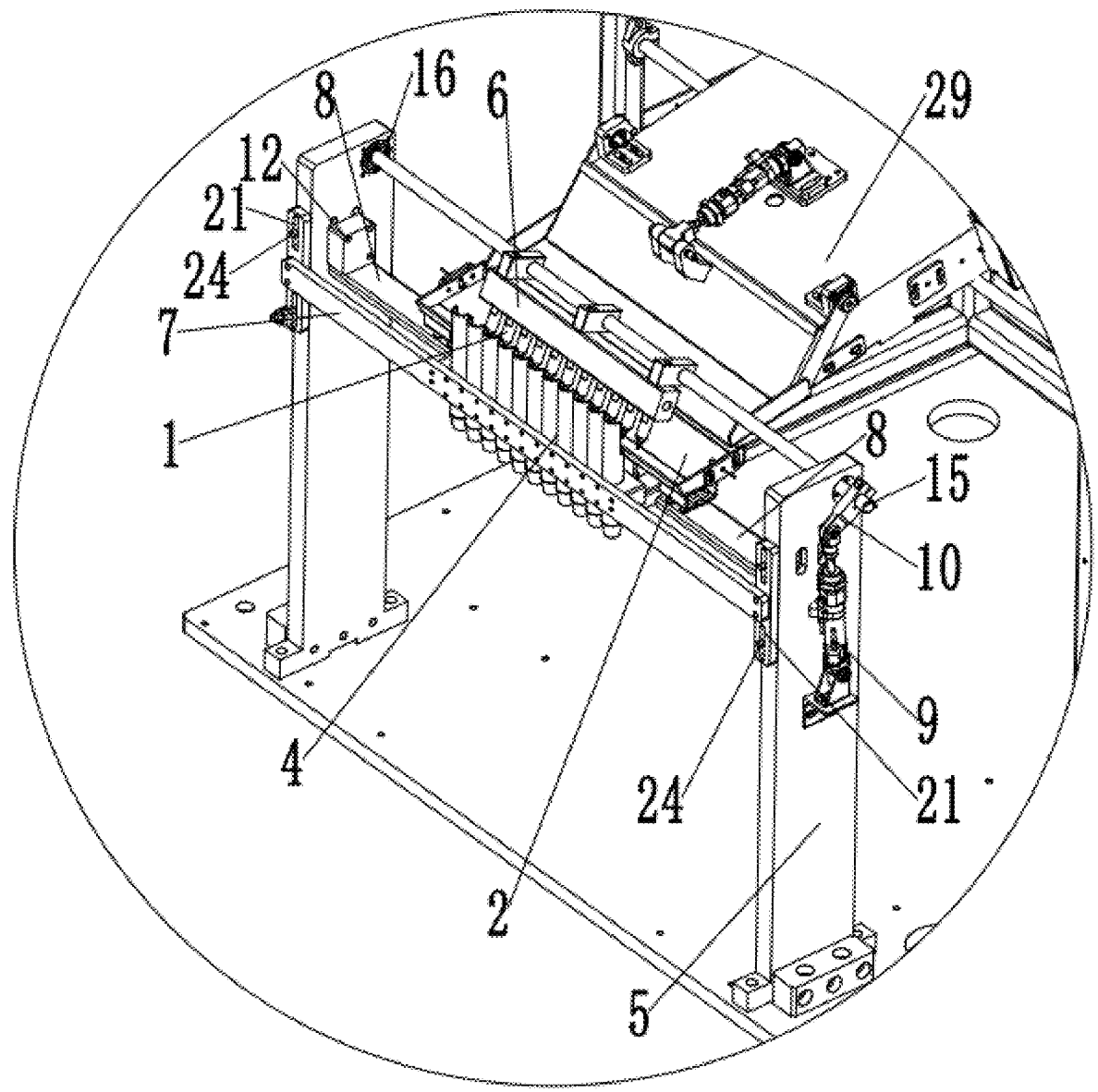
FIG. 9 is a forward-looking structure diagram of an air-suction seed dispersing and seeding device (without a seeding disc).
Figure 10:
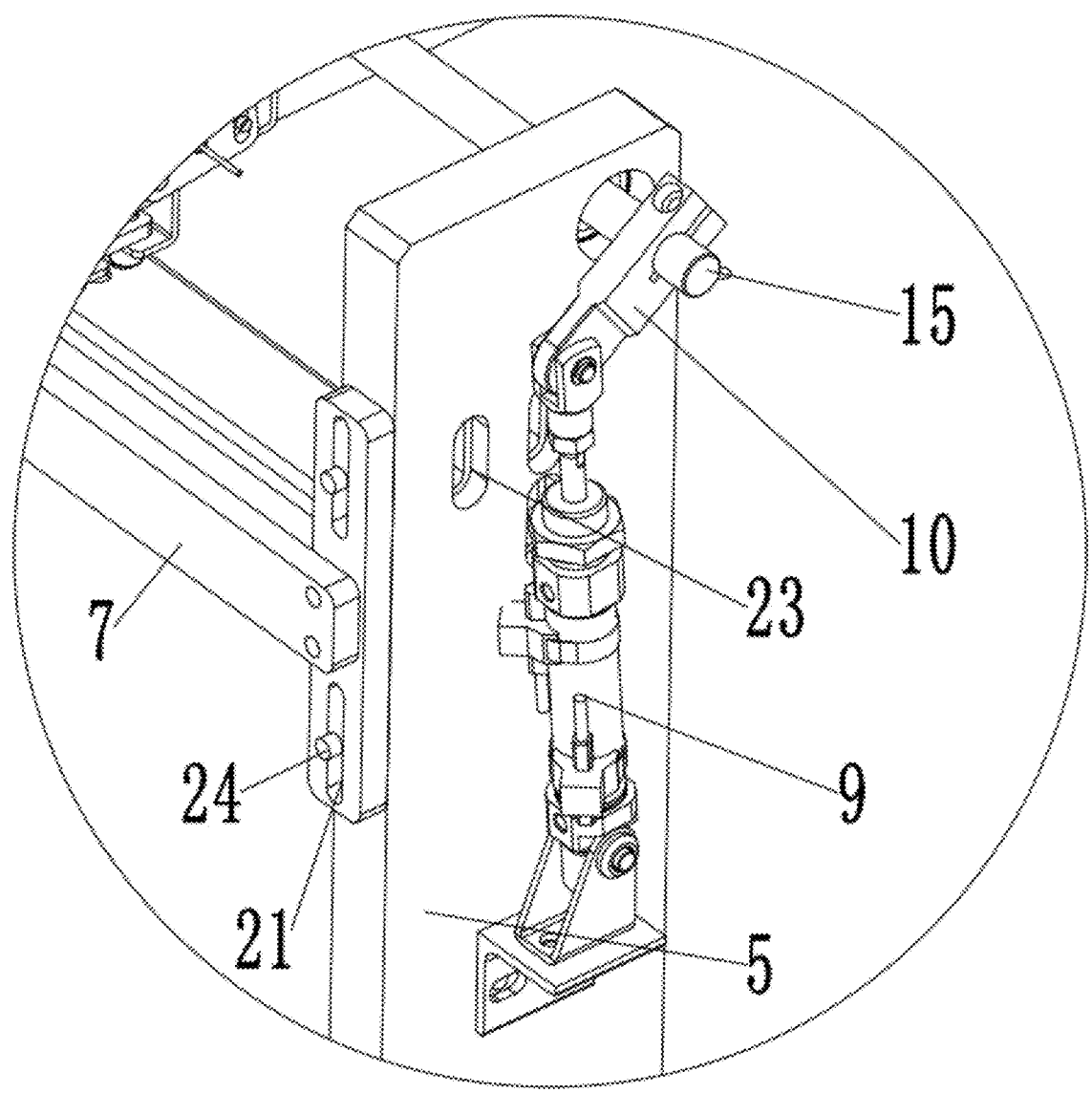
FIG. 10 is a local enlarged drawing of FIG. 9.
Figure 11:
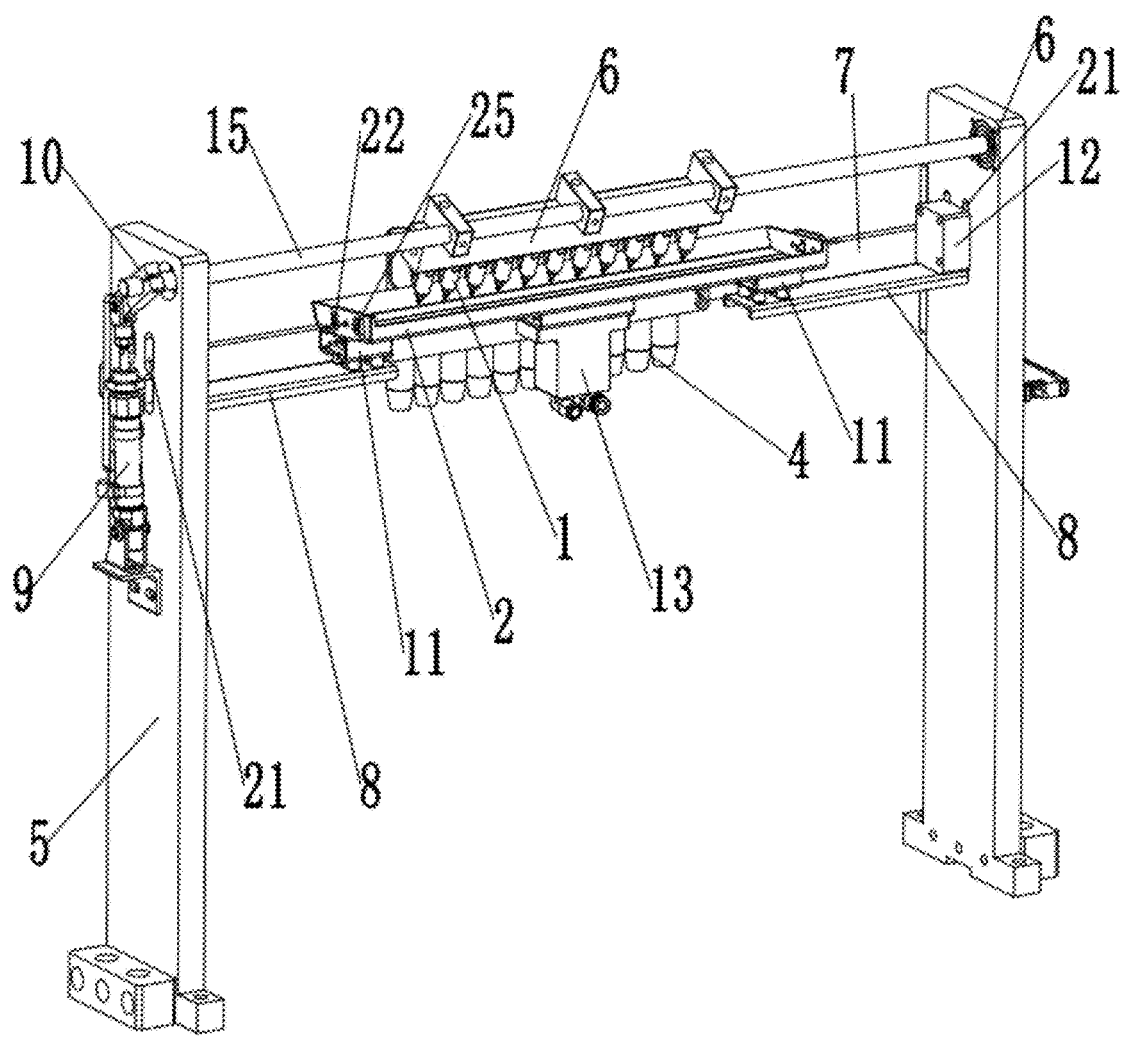
FIG. 11 is a backward-looking structure diagram of an air-suction seed dispersing and seeding device (without a seeding disc).
Figure 12:
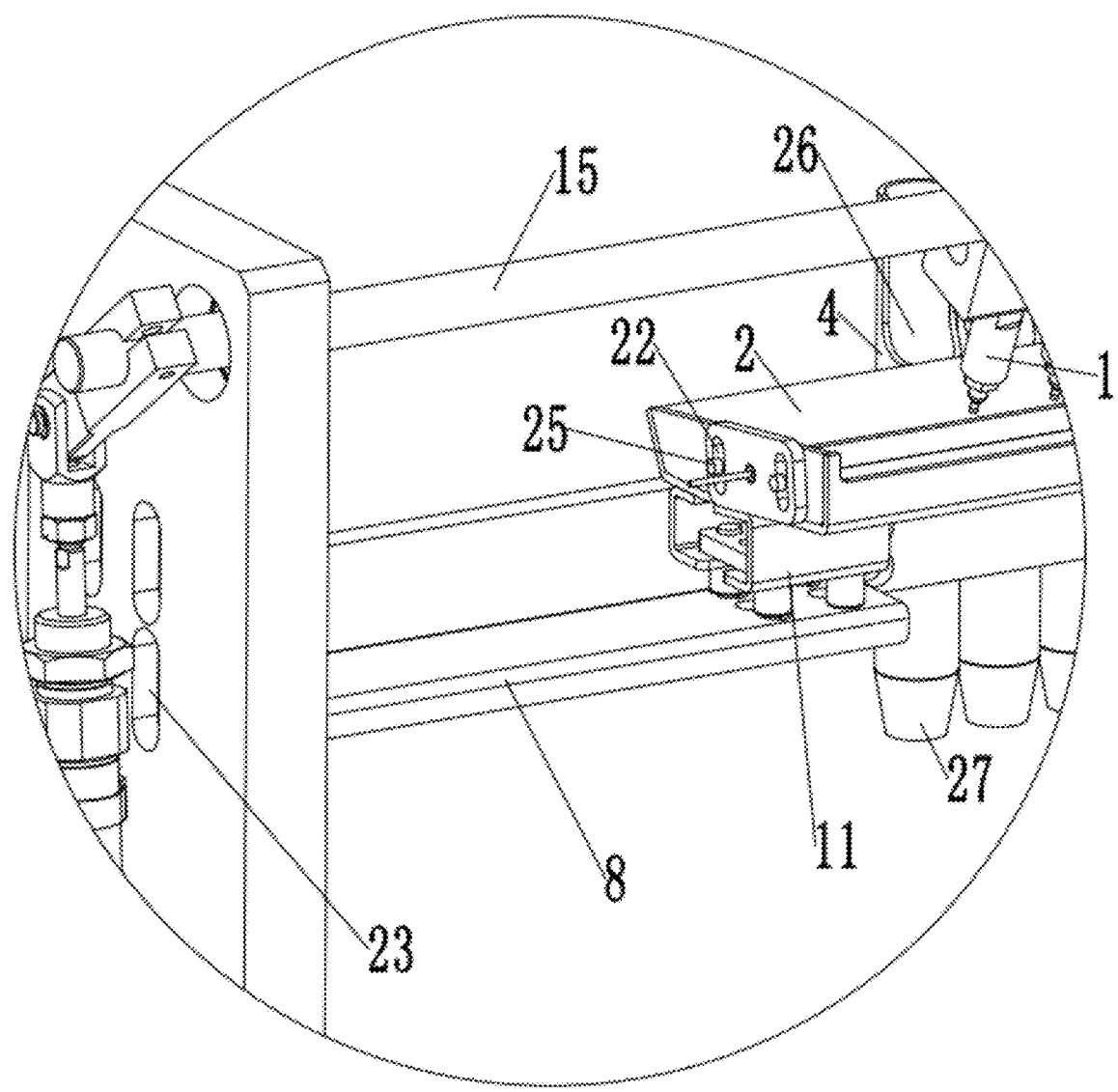
FIG. 12 is a local enlarged drawing of FIG. 11.
Figure 13:
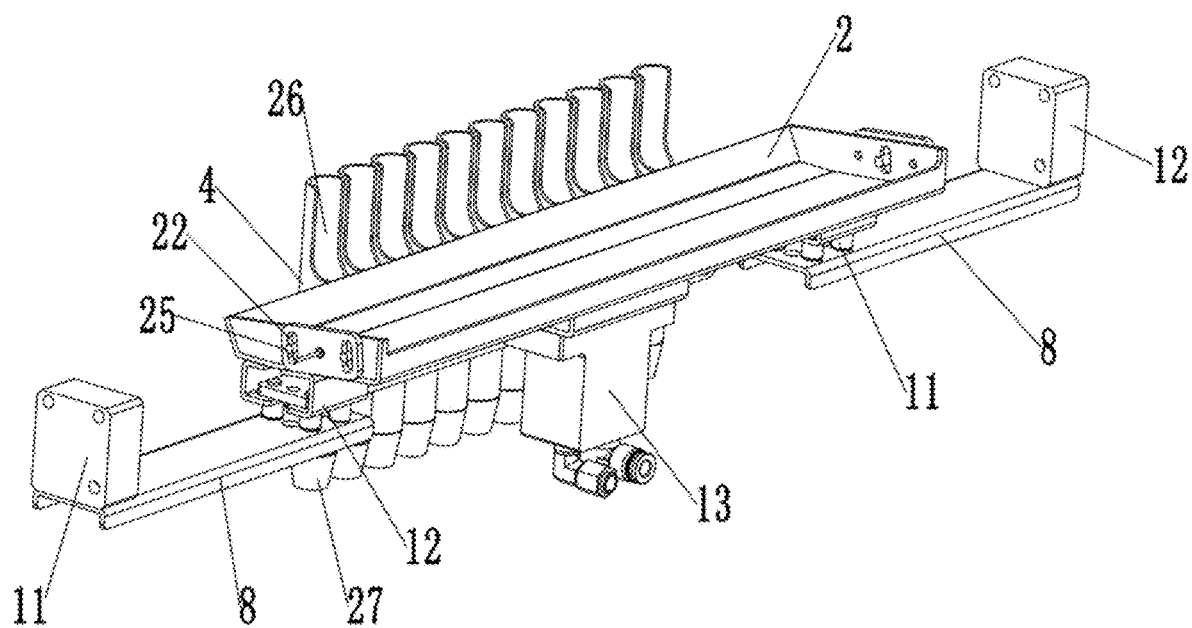
FIG. 13 is a structure diagram of a vibration disc and a seed guide tube.
Figure 14:
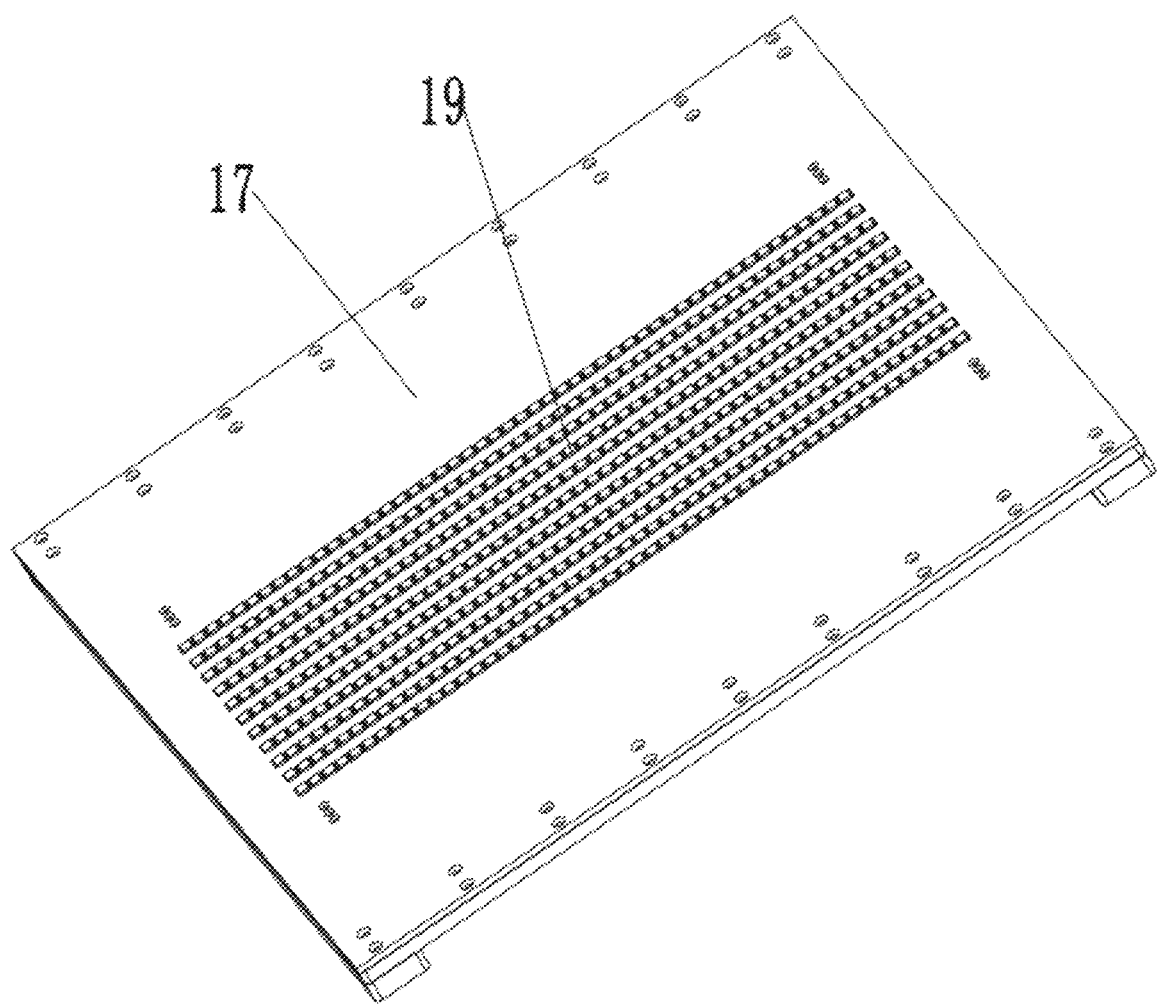
FIG. 14 is a downward-looking three-dimensional structure diagram of a seeding disc.
Figure 15:
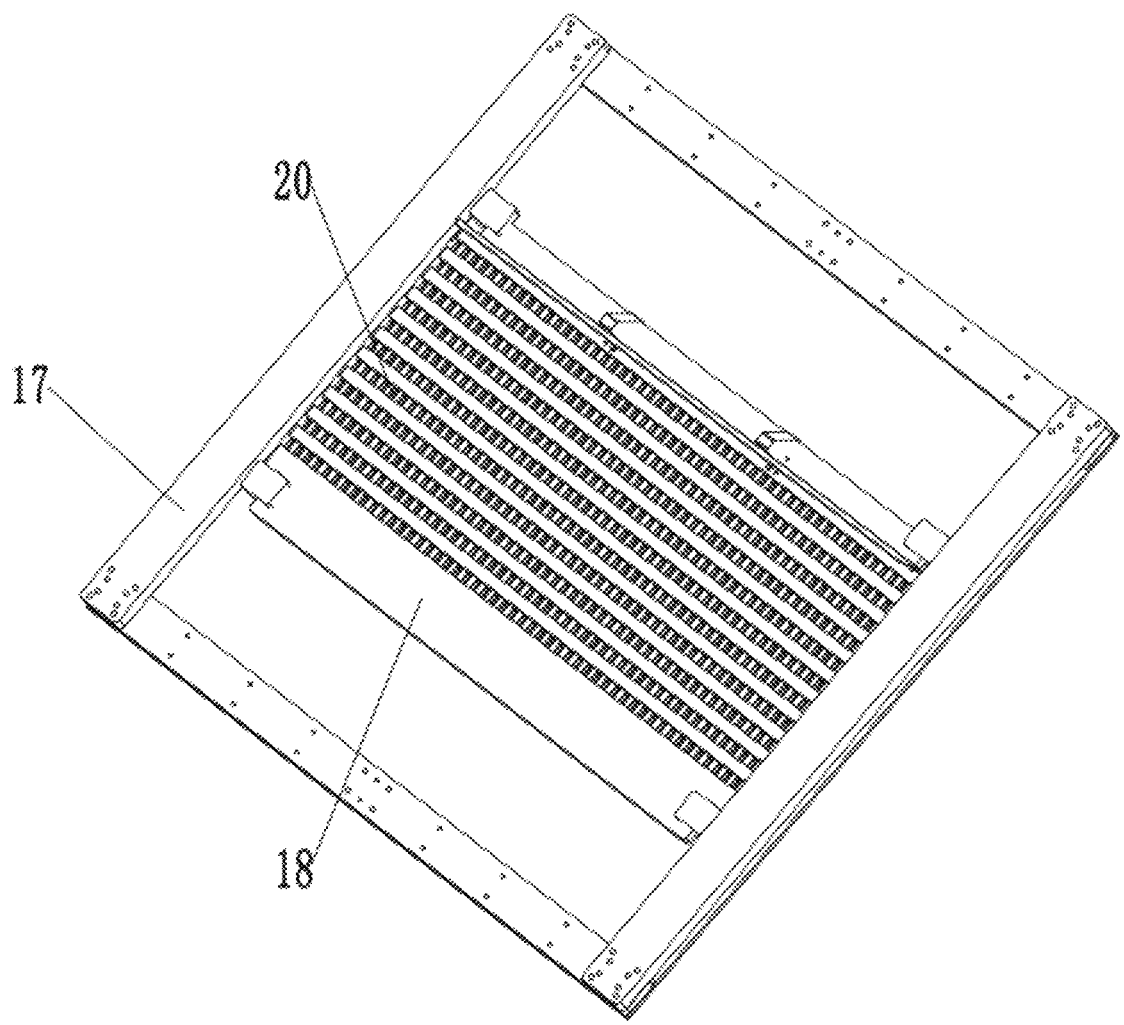
FIG. 15 is an upward-looking three-dimensional structure diagram of a seeding disc.
Figure 16:
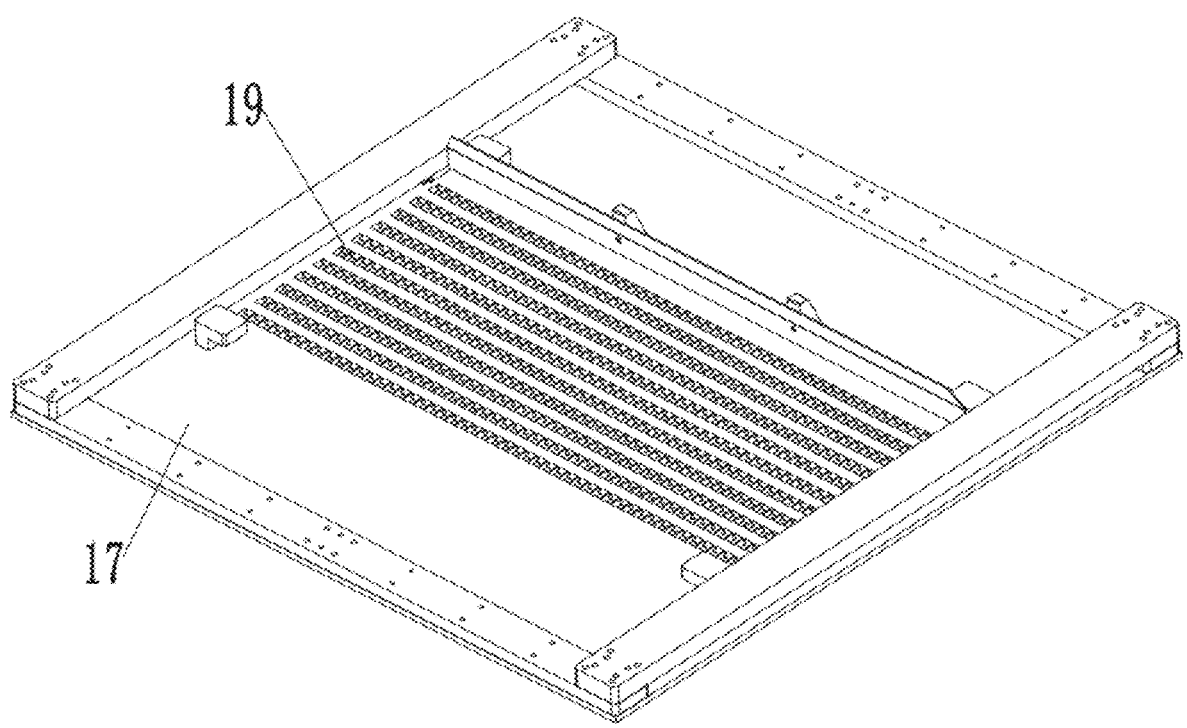
FIG. 16 is a structure diagram of an upper disc body.
Figure 17:
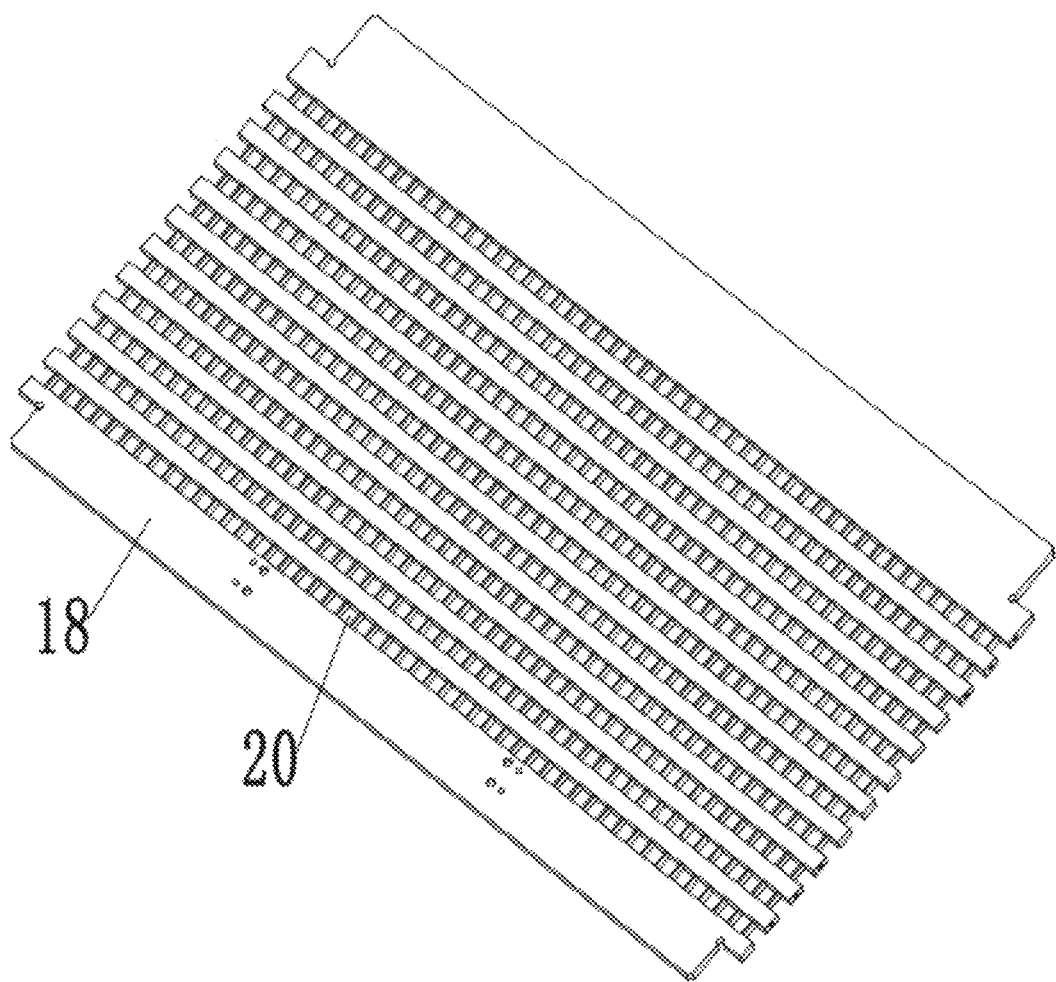
FIG. 17 is a structure diagram of a lower disc body.

Referring to FIG. 1 to FIG. 17, an automatic detection device for seed vigor is provided in the embodiment. The automatic detection device for seed vigor includes a seed screening system and a seed dispersing and seeding device capable of arranging seeds in a matrix. The seed dispersing and seeding device includes a seeding mechanism and a seeding disc 3 capable of linearly moving along a horizontal direction. A disc surface of the seeding disc 3 is arranged horizontally, and seeding ports capable of being opened and closed are formed in the disc surface of the seeding disc 3. The seeding ports are arranged in a matrix. The seeds can be accommodated through the seeding ports. A line direction of the seeding ports is parallel to a moving direction of the seeding disc 3. A row direction of the seeding ports is vertical to the moving direction of the seeding disc 3. The seeding mechanism is used for putting single seeds into the seeding ports. The seed screening system includes a seed screening device and a hyperspectral imaging device for detecting seed vigor. The hyperspectral imaging device includes a hyperspectral lens 30 located above the seeding disc 3. The hyperspectral lens 30 is capable of being aligned to the seeding disc 3. A scanning area of the hyperspectral lens 30 is located on a moving trail of the seeding disc 3. The scanning length of the scanning area along the row direction of the seeding ports is capable of covering at least a single row of seeding ports. That is, the hyperspectral lens 30 is capable of scanning the whole row of seeds on the seeding disc 3. The seed screening device includes a seed sucker 31 and a multi-axis mechanical arm 32 for moving the seed sucker 31. The multi-axis mechanical arm 32 is similar to the principle of a mechanical arm. The multi-axis mechanical arm 32 is capable of driving the seed sucker 31 to move in X-axis, Y-axis and Z-axis direction. A horizontal moving area of the seed sucker 31 is located on the moving trail of the seeding disc 3. The moving range of the horizontal moving area along the row direction of the seeding ports is capable of covering a single row of seeding ports.

According to the working principle, the seeds are implanted into the seeding ports of the seeding disc 3 through the seeding mechanism. The seeds are arranged in a matrix on the seeding disc 3, and then the seeding disc 3 is moved below the hyperspectral lens 30, so that the disc surface of the seeding disc 3 is located in the scanning area of the hyperspectral lens 30, and the seeds on the seeding disc 3 are scanned by the hyperspectral lens 30. The hyperspectral lens 30 can scan seeds row by row until completely scanning the whole seeding disc 3. Scanning information is transmitted to a control device by the hyperspectral lens 30. Each seeding port on the seeding disc 3 corresponds to one coordinate. The coordinate information can be set in the control device in advance. The control device recognizes non-vigorous seeds according to the scanning information, and the coordinates of the non-vigorous seeds are marked. And then the coordinate information of the non-vigorous seeds is sent to the multi-axis mechanical arm 32. The multi-axis mechanical arm 32 drives the seed sucker 31 to accurately reach the positions of the non-vigorous seeds according to the coordinates, and the non-vigorous seeds are sucked by the seed sucker 31, so that the seeds with better vigor are retained in the seeding disc 3 to realize screening of seeds. Placement of the seeds on the seeding disc 3, vigor detection for the seeds and screening of vigor seeds can be completed automatically, thus realizing the automation of the whole process, having high production efficiency and good screening effect, greatly saving manpower and material resources, and being suitable for large-scale promotion.

A plurality of single separated seeds in a detection area are detected by the hyperspectral lens 30, and various indicators including the presence or absence of external physical damage and internal chemical damage can be detected, and the damages of the non-vigorous seeds may include external damage, thermal damage, aging, cold injury and the like.

In one embodiment, a hyperspectral support is included. The hyperspectral support includes a lens support frame 33 vertically arranged and a lens connecting plate 34. The hyperspectral lens 30 is installed by the lens connecting plate 34. Preferably, the hyperspectral lens 30 is slidably connected to the hyperspectral support. That is, the hyperspectral lens 30 slides front and back along a hyperspectral outer wall inside a horizontal plane. The lens connecting plate 34 is arranged on the top of the lens support frame 33. Preferably, the lens connecting plate 34 can also be slidably connected to the lens support frame 33. That is, the lens connecting plate 34 can move up and down along the lens support frame 33.

In one embodiment, as shown in FIG. 1 to FIG. 17, the seeding mechanism includes air-suction seeding needles 1, a vibration disc 2 and a seeding disc 3. The suction of the air-suction seeding needles 1 is adjustable, and the air-suction seeding needles 1 are arranged in rows. A row-up direction of the air-suction seeding needles 1 is the same as the row direction of the seeding ports. At least one row of air-suction seeding needles 1 is provided. Preferably, one row of air-suction seeding needles 1 is provided. If a plurality of rows of air-suction seeding needles 1 are provided, the arrangement direction of a plurality of rows of air-suction seeding needles 1 is the same as a line arrangement direction of the seeding ports. The quantity of the air-suction seeding needles 1 in a single row corresponds to the quantity of the seeding ports in a single row. The air-suction seeding needles 1 reciprocate along the moving direction of the seeding disc 3 through a swing mechanism. A vertical projection of a swing path of the air-suction seeding needle 1 is located on a moving path of the seeding port corresponding to the air-suction seeding needle 1 to ensure that the seeds sucked by the air-suction seeding needles 1 can be put into the corresponding seeding ports. The vibration disc 2 is used for placing seeds. The vibration disc 2 is located between the seeding disc 3 and the air-suction seeding needles 1 at a height position. The vibration disc 2 is located in the vertical projection of the swing path of the air-suction seeding needles 1 at a horizontal position. The vibration disc 2 and the air-suction seeding needles 1 have a preset height difference capable of sucking seeds.

The working principle of the seeding mechanism is as follows.

Step 1, seed spreading. The seeds are placed into the vibration disc 2. Under the action of continuous vibration of the vibration disc 2, the seeds may bounce continuously to be uniformly dispersed on the disc surface, and no seeds cannot be at the edge all the time, thereby facilitating effective suction of the air-suction seeding needles 1.

Step 2, seed sucking. The air-suction seeding needle 1 swings in a seed pile close to the vibration disc 2 under the action of the swing mechanism, and realizes accurate suction to a single seed by adjusting the suction. The determinant factor of the suction of the air-suction seeding needle 1 is the size and weight of the seed. The size and weight of the seed are mainly the standard weight and average size of the variety of seeds. Although the seeds have different sizes, the difference is not particularly large. By adjusting the suction, only one seed can be sucked at a time. Each air-suction seeding needle 1 can be controlled independently. An independent air-suction control system allows to precisely control the suction and release of seeds by each air-suction seeding needle 1, thereby ensuring the accuracy of seeding and reducing the problems of repeated and missed seeding.

Step 3, seed releasing. The air-suction seeding needle 1 swings back close to the seeding disc 3 and moves to the upper part of the first row of seeding ports. With the suspension of air suction, the seeds are released from the air-suction seeding needles 1 and fall into the seeding ports.

Step 4, circulating seeding. After one time of seeding at the seeding ports is completed, the air-suction seeding needles 1 are rotated back to the upper part of the seed pile again, and the seeding disc 3 is advanced to move the second row of seeding ports to the first row of seeding ports. The next round of suction and seeding is carried out until the seeding of all seeding ports is completed, and then the seeds arranged in a matrix can be released downward as long as the seeding ports are opened.

In the embodiment, as shown in FIG. 1 to FIG. 17, seed guide tubes 4 are arranged between the seeding disc 3 and the air-suction seeding needles 1 for precisely guiding the seeds into the seeding ports of the seeding disc 3. The seed guide tubes 4 are arranged in rows. A row-up direction of the seed guide tubes 4 is the same as that of the air-suction seeding needles 1, and the quantity of the seed guide tubes 4 corresponds to that of the air-suction seeding needles 1. A tube opening in one end of the seed guide tube 4 is arranged upward and provided with a seed feeding notch 26. The seed feeding notch 26 faces the air-suction seeding needle 1 and is located on the swing path of the air-suction seeding needle 1 for the air-suction seeding needle 1 to screw in the seed feeding notch 26, so that the seeds accurately fall into the seed guide tubes 4. A tube opening in the other end of the seed guide tube 4 is a tapered tube opening 27 and arranged downward. A vertical projection of the tapered tube opening 27 is located on the moving path of the seeding port. The seeding port corresponds to the tapered tube opening 27 and is located below the tapered tube opening 27 by moving the seeding disc 3, so that the seeds can precisely fall into the seeding ports. The seeds can be moved to precisely fall into the seeding ports in a necking manner of the tapered tube opening 27. The seed guide tube 4 may be arranged vertically or inclined.

Further, in the embodiment, as shown in FIG. 1 to FIG. 17, the automatic detection device for seed vigor includes a device stand 5 and a gas needle installation part 6. The air-suction seeding needles 1 are installed on the gas needle installation part 6. The device stand 5 is rotatably connected to a rotating shaft 15. An axis of the rotating shaft 15 is parallel to the row-up direction of the air-suction seeding needles 1. The gas needle installation part 6 is fixedly connected to the rotating shaft 15. The gas needle installation part 6 can rotate through the rotating shaft 15, and then the air-suction seeding needle 1 reaches the purpose of swing. The device stand 5 is provided with a moving space 28 for the seeding disc 3 to pass through, so that the seeding disc 3 can move horizontally and linearly under the air-suction seeding needle 1. Preferably, both ends of the rotating shaft 15 can be rotatably connected to the device stand 5 through bearings 16.

Further, in the embodiment, as shown in FIG. 1 to FIG. 17, the swing mechanism includes a telescopic cylinder 9 and a connecting rod 10. A cylinder block of the telescopic cylinder 9 is hinged with the device stand 5. A piston rod of the telescopic cylinder 9 is hinged with one end of the connecting rod 10, and the other end of the connecting rod 10 is fixedly connected with an end of the rotating shaft 15. The piston rod of the telescopic cylinder 9 is telescopic, and the rotating shaft 15 can be driven to rotate through the connecting rod 10, so that the swing of the air-suction seeding needle 1 is realized. The telescopic cylinder 9 may be any one of an electric cylinder, a pneumatic cylinder and a hydraulic cylinder. Of course, in addition to the above mode, the above swing mechanism can also be in other common modes in the market, such as direct adoption of a driving motor. The driving motor is connected with the rotating shaft 15 through a reducer. The driving motor can be installed on the device stand 5, or can be installed on the ground through a motor base, and an output shaft of the driving motor rotates to drive the rotating shaft 15 to rotate.

In the embodiment, as shown in FIG. 1 to FIG. 17, the device stand 5 is provided with a height adjustable installation beam 7. The seed guide tube 4 is fixed on the installation beam 7. The height of the installation beam 7 is adjustable. The height positional relationship between the seed feeding notch 26 and the air-suction seeding needle 1 can be changed to be adjusted to suitable positions, thereby ensuring that the air-suction seeding needle 1 can be screwed into the seed feeding notch 26 and facilitating the seeds to fall into the seed guide tubes 4.

Further, in the embodiment, as shown in FIG. 1 to FIG. 17, a vertically arranged first strip hole 21 is formed in the installation beam 7. The device stand 5 is provided with a first adjusting bolt 24. The first adjusting bolt 24 passes through the first strip hole 21 and is locked by a nut. The nut is loosened through external rotation. The installation beam 7 is moved up or down to change the positional relationship between the first adjusting bolt 24 and the first strip hole 21, and then the nut is tightened through internal rotation to change the height of the installation beam 7, thereby adjusting the height of the seed guide tube 4.

In the embodiment, as shown in FIG. 1 to FIG. 17, the device stand 5 is provided with two installation beams 8. The device stand 5 is provided with two installation beams 8. Opposite ends of the two installation beams 8 are provided with installation heads 11. A vertically arranged second strip hole 22 is formed in the installation head 11. Both ends of the vibration disc 2 are provided with second adjusting bolts 25. The second adjusting bolt 25 passes through the second strip hole 22 and is locked by a nut. The nut is loosened through external rotation. The vibration disc 2 is moved up or down to change the positional relationship between the second adjusting bolt 25 and the second strip hole 22, and then the nut is tightened through internal rotation to change the height of the vibration disc 2, so that the height relationship between the vibration disc 2 and the air-suction seeding needles 1 is adjusted to reach the preset height difference. A vibration device 13 is installed at the bottom of the vibration disc 2 to provide a vibration source for the vibration disc 2.

Further, in the embodiment, as shown in FIG. 1 to FIG. 17, one end, away from the installation head 11, of the installation transverse plate 8 is provided with an adjusting head 12. A bolt hole is formed in the adjusting head 12. A vertically arranged third strip hole 23 is formed in the device stand 5. A third adjusting bolt passes through the bolt hole and the third strip hole 23 and is locked by a nut. The nut is loosened through external rotation. The installation transverse plate 8 is moved up or down to change the positional relationship between the third adjusting bolt and the third strip hole 23, and then the nut is tightened through internal rotation to change the height of the installation transverse plate 8, so that the height of the vibration disc 2 is adjusted.

In the embodiment, as shown in FIG. 1 to FIG. 17, the seeding disc 3 includes an upper disc body 17 and a lower tray body 18. The upper disc body 17 and the lower disc body 18 are laminated up and down. The upper disc body 17 is movable in the line direction of the seeding ports, and the lower disc body 18 is movable in the line direction or row direction of the seeding ports. The seeding port includes an upper normally-open port 19 and a lower normally-open port 20. The upper normally-open port 19 is formed in the upper disc body 17, and the lower normally-open port 20 is formed in the lower disc body 18. A vertical projection of the upper normally-open port 19 is capable of coinciding with a moving path of the lower normally-open port 20. When the lower disc body 18 moves, the upper normally-open port 19 and the lower normally-open port 20 do not coincide completely, and the upper normally-open port 19 is blocked by the lower disc body 18. At this time, the seeding port is in a closed state, and the seeds exist in the upper normally-open port 19. When the lower disc body 18 is moved so that the upper normally-open port 19 and the lower normally-open port 20 are completely coincided, the seeding port is in an open state, and the seeds pass through the upper normally-open port 19 and the lower normally-open port 20 in turn to fall off. The upper disc body 17 may be provided with a limit sliding rail, and the lower disc body 18 is slidably connected to the lower part of the upper disc body 17 through the limit sliding rail. The lower disc body 18 is moved by a moving mechanism such as a telescopic rod, a screw nut, or the like. For example, a fixed end of the telescopic rod is fixedly connected with the upper disc body 17, and a movable end of the telescopic rod is fixedly connected with the lower disc body 18. A telescopic direction is parallel to a line direction of the upper normally-open ports 19 arranged in a matrix or a row direction of the upper normally-open ports 19 arranged in a matrix. For a lead screw nut, a screw is rotatably connected to the upper disc body 17, and the nut is installed on the lower disc body 18. The motor drives the screw to rotate, and the nut can drive the lower disc body 18 to move. An axis of the screw is parallel to the line direction of the upper normally-open ports 19 arranged in a matrix or the row direction of the upper normally-open ports 19 arranged in a matrix.

Further, in the embodiment, as shown in FIG. 1 to FIG. 17, the seeding disc 3 is moved by a linear sliding rail 14, and the linear sliding rail 14 passes through the moving space 28.

Further, in the embodiment, as shown in FIG. 1 to FIG. 17, seeds are conveyed to the vibration disc 2 by conveying equipment 29. Preferably, the conveying equipment 29 conveys seeds to the vibration disc 2 through a seed feeding track. A seed feeding notch is formed in a side wall of the vibration disc 2. The seed feeding track stretches into the upper part of the vibration disc 2 through the seed feeding notch.

In one embodiment, as shown in FIG. 1 to FIG. 17, two seeding discs 3 are provided and include a first seeding disc 35 and a second seeding disc 36, respectively. A moving trail of the first seeding disc 35 is located above a moving trail of the second seeding disc 36 to avoid the interference of the first seeding disc 35 and the second seeding disc 36. Preferably, the size of the first seeding disc 35 is larger than the size of the second seeding disc 36.

In the embodiment, the automatic detection device for seed vigor also includes a sliding rail support frame 37. The sliding rail support frame 37 is arranged on an upper surface of a machine body 38. And two linear sliding rails 14 are provided and used for being matched with the first seeding disc 35 and the second seeding disc 36, respectively. The two sliding rails include a first sliding rail and a second sliding rail, respectively. The first sliding rail and the second sliding rail are fixedly arranged on the sliding rail support frame 37. The first sliding rail is located above the second sliding rail. The first sliding rail is slidably connected with the first seeding disc 35, and the second sliding rail is slidably connected with the second seeding disc 36.

In the embodiment, the sliding rail support frame 37 is a cuboid structure of which an opening is formed in the top. The cuboid structure is internally provided with a second sliding rail support frame 37. The second sliding rail is fixed by the second sliding rail support frame 37, so that the second sliding rail can be fixed inside the support frame, and the second seeding disc 36 can be embedded into the sliding rail support frame 37. A disc surface of the second seeding disc 36 faces the opening of the sliding rail support frame 37. Preferably, a top surface of the second seeding disc 36 is close to a top surface of the sliding rail support frame 37. The moving trail of the first seeding disc 35 is located above the sliding rail support frame 37. Preferably, the first seeding disc 35 is slidably arranged on the top surface of the sliding rail support frame 37. In this way, when the first seeding disc 35 is under the air-suction seeding needles to participate in seeding operation, the second seeding disc 36 can travel under the hyperspectral lens 30 or the seed sucker 31 to perform the screening operation of non-vigorous seeds. After that, the first seeding disc 35 can travel below the hyperspectral lens 30 or the seed sucker 31 for screening operation, and the second seeding disc 36 can be returned to the air-suction seeding needles to accommodate seeds, thereby reciprocating operation to ensure efficient operation of the whole device.

The seed sucker 31 may be an air nozzle (a suction nozzle), and the seed sucker 31 is externally connected with an air extraction device, such as an air cylinder, similar to the principle of a vacuum cleaner. The seed sucker 31 generates suction by the external device to suck non-vigorous seeds, thereby realizing the elimination of non-vigorous seeds.

In one embodiment, as shown in FIG. 1 to FIG. 17, the lens support frame 33 is slidably disposed on a top surface of the machine body 38, and the lens support frame 33 can slide back and forth along an outer side wall of the sliding rail support frame 37. A seed collection box is arranged inside the machine body 38. After the seeds pass through the upper normally-open port 19 and the lower normally-open port 20 in turn to fall off, the seeds can enter the seed collection box inside the machine body 38. The multi-axis mechanical arm 32 is installed on the machine body 38 through a base 39, and the multi-axis mechanical arm 32 can rotate on the base 39. Specifically, the multi-axis mechanical arm 32 includes a first rotating body 43 and a second rotating body 44. The first rotating body 43 is rotatably arranged on the base 39. When the first rotating body 43 rotates, the second rotating body 44 the first rotating body 43 can drive the second rotating body 44 to move synchronously, and the second rotating body 44 is rotatably arranged at one end, away from the base 39, of the first rotating body 43. The multi-axis mechanical arm 32 is provided with a lifting rod 42. Specifically, the lifting rod 42 passes through the second rotating body 44, and the lifting rod 42 can move up and down, that is, perform Z-axis movement. The movement mode is a common connecting structure in the prior art. A seed sucker connecting plate 40 is connected between the lifting rod 42 and the seed sucker 31. The seed sucker 31 can be extended outward through the seed sucker connecting plate 40, and the extension amount of the seed sucker 31 can be adjusted by changing the size of the seed sucker connecting plate 40.

In one embodiment, a neon bulb support 41 is also provided. The neon bulb support 41 is located between the multi-axis mechanical arm 32 and the hyperspectral lens 30.

A neon bulb is fixed by the neon bulb support 41. The neon bulb can irradiate a spectrum detection area as a light source, and the imaging effect of the spectrum is better under the irradiation of the neon bulb. Preferably, the neon bulb support 41 can slide back and forth along the outer side wall of the sliding rail support frame 37.

It needs to be noted that for those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, and therefore, all changes, including the meanings and scopes of equivalent elements, of the claims are aimed to be included in the present disclosure. Any mark of attached figures in the claims should not be regarded as limitation to the involved claims.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In summary, the contents of this specification should not be understood as the limitation of the present disclosure.

What is claimed is:

1. An automatic detection device for seed vigor, comprising a seed screening system and a seed dispersing and seeding device for arranging seeds in a matrix,
   wherein the seed dispersing and seeding device comprises a seeding mechanism and a seeding disc capable of linearly moving along a horizontal direction, a disc surface of the seeding disc being arranged horizontally, seeding ports capable of being opened and closed being formed in the disc surface of the seeding disc, the seeding ports being arranged in a matrix, a line direction of the seeding ports being parallel to a moving direction of the seeding disc, a row direction of the seeding ports being vertical to the moving direction of the seeding disc, and the seeding mechanism being used for putting single seeds into the seeding ports;
   wherein the seed screening system comprises a seed screening device and a hyperspectral imaging device for detecting seed vigor; the hyperspectral imaging device comprises a hyperspectral lens located above the seeding disc, a scanning area of the hyperspectral lens being located on a moving trail of the seeding disc, the scanning length of the scanning area along the row direction of the seeding ports being capable of covering at least a single row of seeding ports; and wherein the seed screening device comprises a seed sucker and a multi-axis mechanical arm for moving the seed sucker, a horizontal moving area of the seed sucker being located on the moving trail of the seeding disc, and the moving range of the horizontal moving area along the row direction of the seeding ports being capable of covering a single row of seeding ports.

2. The automatic detection device for seed vigor according to claim 1, comprising a hyperspectral support, wherein the hyperspectral support comprises a lens support frame vertically arranged and a lens connecting plate for installing the hyperspectral lens, the lens connecting plate being arranged on the top of the lens support frame, and the hyperspectral lens being slidably connected with the lens connecting plate.

3. The automatic detection device for seed vigor according to claim 1, wherein the seeding mechanism comprises air-suction seeding needles with adjustable suction and a vibration disc for placing seeds, the disc surface of the seeding disc being arranged horizontally, the air-suction seeding needles being arranged in rows, a row-up direction of the air-suction seeding needles being the same as the row direction of the seeding ports, the quantity of the air-suction seeding needles in a single row corresponding to the quantity of the seeding ports in a single row, the air-suction seeding needles reciprocating along the moving direction of the seeding disc through a swing mechanism, a vertical projection of a swing path of the air-suction seeding needle being located on a moving path of the seeding port corresponding to the air-suction seeding needle, the vibration disc being located between the air-suction seeding needles and the seeding disc at a height position, the vibration disc being located in the vertical projection of the swing path of the air-suction seeding needles at a horizontal position, and the vibration disc and the air-suction seeding needles having a preset height difference capable of sucking seeds.

4. The automatic detection device for seed vigor according to claim 3, wherein seed guide tubes are arranged between the seeding disc and the air-suction seeding needles, the seed guide tubes being arranged in rows, a row-up direction of the seed guide tubes being the same as that of the air-suction seeding needles, the quantity of the seed guide tubes corresponding to that of the air-suction seeding needles, a tube opening in one end of the seed guide tube being arranged upward and provided with a seed feeding notch, the seed feeding notch facing the air-suction seeding needle and being located on the swing path of the air-suction seeding needle, a tube opening in the other end of the seed guide tube being a tapered tube opening and arranged downward, and a vertical projection of the tapered tube opening being located on the moving path of the seeding port.

5. The automatic detection device for seed vigor according to claim 4, comprising a device stand and a gas needle installation part for installing the air-suction seeding needles, the gas needle installation part being rotatably connected to the device stand through a rotating shaft, an axis of the rotating shaft being parallel to the row-up direction of the air-suction seeding needles, and the device stand being provided with a moving space for the seeding disc to pass through.

6. The automatic detection device for seed vigor according to claim 5, wherein the seeding disc comprises an upper disc body and a lower disc body which are laminated up and down, the upper disc body being capable of moving along the line direction of the seeding ports, and the lower disc body being capable of moving along the line direction or row direction of the seeding ports; and wherein the seeding port comprises an upper normally-open port formed in the upper disc body and a lower normally-open port formed in the lower disc body, a vertical projection of the upper normally-open port being capable of coinciding with a moving path of the lower normally-open port.

7. The automatic detection device for seed vigor according to claim 6, wherein the seeding disc moves through a linear sliding rail, the linear sliding rail passing through the moving space.

8. The automatic detection device for seed vigor according to claim 7, wherein two seeding discs are provided and comprise a first seeding disc and a second seeding disc, respectively, a moving trail of the first seeding disc being located above a moving trail of the second seeding disc.

9. The automatic detection device for seed vigor according to claim 8, comprising a sliding rail support frame, wherein two linear sliding rails are provided and comprise a first sliding rail and a second sliding rail, respectively, the first sliding rail and the second sliding rail being fixedly arranged on the sliding rail support frame, the first sliding rail being located above the second sliding rail, the first sliding rail being slidably connected with the first seeding disc, and the second sliding rail being slidably connected with the second seeding disc.

10. The automatic detection device for seed vigor according to claim 9, wherein the sliding rail support frame is a cuboid of which an opening is formed in the top, the second seeding disc being embedded into the sliding rail support frame, a disc surface of the second seeding disc facing the opening of the sliding rail support frame, and the moving trail of the first seeding disc being located above the sliding rail support frame.

\* \* \* \* \*